United States Patent Office 3,248,388
Patented Apr. 26, 1966

3,248,388
PURIFICATION OF CAPROLACTAM
Karl Wintersberger, Ludwigshafen (Rhine), and Gerd Wunsch, Speyer, Germany, assignors to Badische Anilin- & Soda-Fabrik Aktiengesellschaft, Ludwigshafen (Rhine), Germany
No Drawing. Filed Mar. 14, 1962, Ser. No. 179,781
Claims priority, application Germany, Mar. 18, 1961, B 61,745
1 Claim. (Cl. 260—239.3)

This invention relates to a process for the purification of lactams which are important for the production of synthetic polyamides. Many methods are already known for the purification of lactams, especially caprolactam. Frequently, impurities which cannot be removed even by repeated distillation may be removed by acting up on an aqueous lactam solution with an oxidizing agent, for example potassium permanganate. Lactams may also be purified by treating them in molten or dissolved condition with hydrogen at various pressures and temperatures in the presence of various hydrogenation catalysts. According to another known method nitrites and hydrogen peroxide are added to the lactams prior to their distillation. Lactams may also be purified by recrystallization. For this purpose organic solvents which are not miscible with water, for example mixtures of heptane isomers, are used. Other known methods of purifying lactams consist in extracting a solution of the lactam in an organic solvent or in water with a different solvent, thus bringing about a separation of the lactam and the impurities. Purification of lactams may also be carried out in conventional manner by passing gases heated to elevated temperature, for example air or superheated vapors, for example steam, through molten lactam, thereby removing the impurities of low boiling point. Readily volatile substances may also be removed by heating finely pulverized lactam in a high vacuum to a temperature which is 5° to 15° C. below the melting point of the lactam. It is further known that a purification of lactams can be achieved by passing a solution of lactam, for example in water, over an anion and cation exchanger and/or over active carbon, a pH correction being applied if necessary. In some cases the impurities can be removed from lactams by treating the lactam melt with concentrated acid salt solutions, for example bisulfate solutions, which are separated again prior to distillation. Sometimes a purification of lactams may be achieved by adding prior to the distillation small amounts of acid substances, for example phosphoric acid or concentrated sulfuric acid, or basic substances, which may have oxidizing or reducing action. Lactams may also be purified by partly freezing out molten impure lactam to which a purifier, for example water or benzene, has been added. According to another known method, purification is achieved by converting the lactam, by means of a metal halide, especially zinc chloride, into a difficultly soluble complex salt from which the lactam can be set free again by means of ammonia. Basic impurities may be salted out from aqueous lactam solutions by leading in carbon dioxide or sulfur dioxide. Finally a method is known for purifying the caprolactam which has been recovered in processing polymerization residues with oleum according to which the lactam is dissolved in oleum in the weight ratio of at least 1:1 at elevated temperature, the solution is neutralized with caustic soda solution, the aqueous layer is separated and the oily layer is fractionated under reduced pressure.

Many of the known methods have very large plant requirement in commercial-scale production. Other methods give good results with lactams prepared from the respective oximes by a rearrangement with sulfuric acid or with lactams obtained by the depolymerization of polyamides, but not with lactams obtained from the respective oximes by gas phase rearrangement in the presence of solid catalysts.

No method has heretofore been known by which a lactam, more specifically caprolactam, which has been prepared by rearrangement of cyclic ketoximes in the gas phase in the presence of solid catalysts, can be purified in a simple manner to such an extent that the monomeric lactam can be stored for prolonged periods, that the lactam has a high stability to a solution of permanganate salts and that a colorless polymer can be prepared from the monomer.

It is an object of the present invention to provide a process for the purification of lactams prepared by catalytic rearrangement of cyclic ketoximes in the gas phase in the presence of solid catalysts. Another object of the invention is to provide a process for the purification of lactams by which lactams having a high stability to potassium permanganate solution and good stability in storage are obtained. A further object of the invention is a process for the purification of lactams by which lactams are obtained which can be polymerized to form polyamides having good colorability.

The said objects are achieved by heating a lactam with from five to eight ring members, in the methylene groups of which one to two hydrogen atoms may be replaced by alkyl groups with from one to three carbon atoms, in the presence of 0.5 to 10% by weight, preferably 2 to 4% by weight, of sulfur trioxide or of oleum with at least 2% by weight of free sulfur trioxide, with reference to lactam, to a temperature above the melting point of the lactam but not more than 30° C. above the said melting point while mixing, leaving the mixture at this temperature for ten minutes to three hours and then distilling it under reduced pressure, if necessary after neutralization.

Lactams which can be purified by the process according to this invention are derived from saturated ω-aminocarboxylic acids. The lactams may have one to two hydrogen atoms of their methylene groups replaced by alkyl groups with from one to three carbon atoms. Examples of suitable lactams are pyrrolidone, valerolactam, oenantholactam, the various monomethyl caprolactams and dimethyl caprolactams and quite especially ε-caprolactam itself.

The lactams to be purified may have been obtained from various sources, for example from oximes of cyclic ketones (by rearrangement), from ω-aminofatty acid nitrites, from ω-hydroxyfatty acid amides or from the corresponding lactones. Lactams which have been obtained by depolymerization of polycaprolactam may also be purified. The process is especially applicable for the purification of lactams which have been prepared by gas phase rearrangement of cyclic ketoximes in the presence of solid catalysts.

Free sulfur trioxide may be used by itself, i.e. without co-using sulfuric acid (hereinafter referred to as pure sulfur trioxide), or oleum containing at least 2% by weight of free sulfur trioxide may be used, i.e. sulfuric acid containing sulfur trioxide dissolved therein. Since pure 100% sulfuric acid contains 81.6% by weight of sulfur trioxide in combined form, up to 97.5% by weight of the sulfur trioxide contained in the oleum may be combined with water, the balance being dissolved free sulfur trioxide.

Sulfur trioxide or oleum is used in an amount of 0.5 to 10% by weight, especially 2 to 4% by weight. In most cases, however, it is not necessary to use more than 7% by weight of sulfur trioxide or oleum as in some cases smaller yields would occur. The amount to be used in any case depends on the impurities contained in the lactam to be purified on the one hand and on the amount of free sulfur trioxide contained in the oleum (when oleum is used) on the other hand, and may readily be determined by a simple experiment. For example with oleum having a low content of free sulfur trioxide, for example 3 to 6% by weight, about 5 to 7% by weight thereof will be used; if, however, the oleum is rich in free sulfur trioxide, about 0.5 to 3% by weight of oleum will be used. The use of 2 to 4% by weight of oleum having a content of 23 to 65% by weight of free sulfur trioxide is preferred.

In the practice of our invention the mixture of lactam and sulfur trioxide or oleum is heated to a temperature above the melting point of the lactam. In general it is sufficient to heat the mixture to a temperature 20° to 30° C. above the melting point, for example to 90° to 100° C. in the case of caprolactam which has a melting point of 70° C. Whilst the mixture can be heated to higher temperatures, no particular advantage is gained thereby. The lactam and oleum may be mixed at a temperature below the melting point and then heated. It is advantageous to mix the lactam and oleum in the liquid state. It is necessary to keep the liquid mixture at a temperature above the melting point for at least ten minutes; in some cases it may be advantageous to prolong the heating, for example to about half an hour. In general, however, heating periods longer than three hours are not necessary.

When more than 2 to 3% by weight of oleum is used, it is advantageous to neutralize the sulfuric acid, for example with ammonia, caustic soda solution, soda ash or caustic potash solution or, generally speaking, with alkalies, after heating. However, alkaline earth hydroxides, or still more generally acid-binding agents may also be used for the neutralization.

Although it has been known to use a small amount of sulfuric acid and a large amount of oleum for the purification of lactams, it was not to be expected that using a small amount of oleum would give better results, i.e. greater purity and/or higher yields than in the prior art methods.

The purification process according to this invention may also be combined with any of the prior art methods by carrying out a preliminary or subsequent purification by conventional methods, for example by treatment with potassium permanganate solution. As criteria for the purity of lactams various characteristic factors, for example the permanganate number and the polymer color number may be used. The permanganate number is the time in seconds required by a solution of 1 g. of lactam in 100 ml. of double-distilled water, to which 1 ml. of N/100 potassium permanganate solution has been added, before the shade of color has faded to that of a solution containing 2 g. of copper sulfate ($CuSO_4 \cdot 5H_2O$) and 3 g. of cobalt chloride ($CoCl_2 \cdot 6H_2O$) in 100 ml. of water. The polymer color number indicates the shade of color of the liquid polymer compared to that of an aqueous solution of hexachloroplatinate solution, the color number 500 corresponding to that of a solution which contains 1.25 g. of potassium hexachloroplatinate (about 0.5 g. Pt), 1 g. of cobalt chloride ($CoCl_2 \cdot 6H_2O$) and 100 ml. of concentrated hydrochloric acid made up to 1000 ml. with water.

Purification according to this invention improves both the permanganate number and the polymer color number. The permanganate number will be improved even more by an aftertreatment with potassium permanganate solution. Treatment with permanganate alone, while giving products with good permanganate numbers, would give unsatisfactory polymer color numbers.

The invention will be further illustrated by, but is not limited to, the following examples in which parts are by weight.

*Example 1*

100 parts of unpurified molten caprolactam, prepared from cyclohexanone by catalytic rearrangement oxime in the gas phase, is heated to 95° C., 2% by weight of 65% oleum being added while stirring. The mixture is kept at 95° C. for an hour and then subjected to distillation at 2 mm. Hg. 94 parts of a colorless distillate are obtained which has a permanganate number of 1000 seconds and good storability. The polymer color number is 40 to 60.

Caprolactam which has been obtained by Beckmann rearrangement by means of sulfuric acid may be purified with a yield of 94% in the same way.

On the contrary, if a caprolactam obtained by catalytic rearrangement of cyclohexanone oxime be treated with 20% by weight of 65% oleum, the yield falls to 52%. Moreover the distillate is not colorless, but yellowish. On the other hand if the purification is carried out with 2% sulfuric acid (monohydrate) a caprolactam is obtained which even after having been purified in the form of an 80% aqueous solution with 0.2% by weight of potassium permanganate has only a permanganate number of 100 and a polymer color number of 350.

*Example 2*

100 parts of caprolactam is purified in the manner described in Example 1 except that it is taken up in water prior to distillation and aftertreated in the form of an 80% aqueous solution with 0.2% by weight of potassium permanganate at room temperature. After an hour any pyrolusite formed is filtered off and the water is removed from the filtrate at a pressure of 14 mm. Hg and a temperature of the water of 100° C. The product is then distilled at 2 mm. Hg, the temperature being raised in the still. Caprolactam is obtained in a yield of more than 92%. The product has a permanganate number of more than 1000 seconds and a polymer color number of 40 to 60 which does not change when the product is kept in storage.

*Example 3*

6 parts of 23% oleum is added to 100 parts of unpurified molten caprolactam, obtained by catalytic rearrangement from cyclohexanone oxime, at 100° C., while stirring, kept at this temperature for half an hour and then distilled at 2 mm. Hg. A colorless distillate having a permanganate number of 520 is obtained which is taken up in water and aftertreated in the form of an 80% solution with 0.2% by weight of potassium permanganate at room temperature. After about 60 minutes any pyrolusite formed is filtered off and the water is removed from the filtrate at 14 mm. Hg.

The product is then distillated at 2 mm. Hg, the temperature in the still being raised to 140° C. Pure caprolactam is obtained in a yield of 93%. It is colorless and stable in storage. It has a permanganate number of 960 seconds and a polymer color number of 40.

*Example 4*

4 parts of 65% oleum is added to 100 parts of unpurified molten caprolactam, obtained by catalytic rearrangement from cyclohexanone oxime, at 100° C. while stirring and the mixture is kept at this temperature for forty-five minutes. The mixture is then distilled at 2 mm. Hg, the temperature in the still being raised to 140° C. Pure caprolactam is obtained in a yield of 91%. It has a permanganate number of more than 900 seconds and a polymer color number of 40 to 60.

*Example 5*

7 parts of 3% oleum is added to 100 parts of unpurified molten caprolactam, obtained by catalytic rearrangement from cyclohexanone oxime, at 100° C., while stirring, kept at this temperature for 10 minutes and then distilled at 2 mm. Hg. The distillate is taken up in water to give an 80% solution and aftertreated with 0.2% by weight of potassium permanganate at room temperature. After about 60 minutes, any pyrolusite formed is filtered off and the water is removed from the filtrate at 14 mm.

Hg. The residue is distilled at 2 mm. Hg, the temperature in the still being raised to 160° C. The caprolactam obtained in a yield of 87% has a permanganate number of 175 seconds and a polymer color number of 50.

*Example 6*

Using nitrogen as a carrier gas, 4 parts of vaporous sulfur trioxide is led into 100 parts of unpurified, dehydrated, molten caprolactam, obtained by catalytic rearrangement from cyclohexanone oxime, at 100° C., while stirring. After all the sulfur trioxide has been added, nitrogen is passed through the reaction mixture for 10 minutes at 100° C. and the mixture is then distilled at 2 mm. Hg. The distillate is taken up in water to form an 80% solution and aftertreated with 0.2% by weight of potassium permanganate at room temperature. After about 60 minutes the pyrolusite formed is filtered off, the water removed from the filtrate at 14 mm. Hg and the remainder distilled at 2 mm. Hg, caprolactam being obtained in a yield of 84%. It has a permanganate number of 1850 seconds and a polymer color number of 40 to 50.

We claim:

A process for the purification of caprolactam prepared by rearrangement of cyclohexanone oxime in the gas phase in contact with a solid, rearrangement catalyst, which comprises heating said lactam to a temperature of from 75° C. to 100° C. while mixing it with 0.5 to 7% by weight of a substance selected from the class consisting of pure sulfur trioxide and oleum which contains at least 2% by weight of free sulfur trioxide, maintaining said temperature for a period of from 10 minutes to 3 hours and distilling the lactam thus treated under reduced pressure.

References Cited by the Examiner

UNITED STATES PATENTS

| 2,763,644 | 9/1956 | Donamura | 260—239.3 |
| 3,016,376 | 1/1962 | Francis | 260—239.3 |

FOREIGN PATENTS

| 892,926 | 5/1944 | France. |
| 739,953 | 10/1943 | Germany. |
| 70,839 | 9/1952 | Holland. |

OTHER REFERENCES

Huhti et al.: "Canadian Journal of Chemistry," vol. 34, pp. 785–94 (1956).

Moeller: "Inorganic Chemistry," pp. 646–8 (Wiley) (1952).

IRVING MARCUS, *Primary Examiner.*

NICHOLAS S. RIZZO, WALTER A. MODANCE,
*Examiners.*